US006994210B2

(12) United States Patent
Kerwel et al.

(10) Patent No.: US 6,994,210 B2

(45) Date of Patent: Feb. 7, 2006

(54) CONVEYOR BELT WITH PLASTIC COVERING

(75) Inventors: Wolfgang Kerwel, Wunstorf (DE); Hans Küppers, Krefeld (DE); Meinolf Ziebarth, Northeim (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 36 days.

(21) Appl. No.: 10/478,719

(22) PCT Filed: May 22, 2002

(86) PCT No.: PCT/EP02/05581

§ 371 (c)(1),
(2), (4) Date: Nov. 24, 2003

(87) PCT Pub. No.: WO02/094692

PCT Pub. Date: Nov. 28, 2002

(65) Prior Publication Data

US 2004/0140180 A1 Jul. 22, 2004

(30) Foreign Application Priority Data

May 23, 2001 (DE) ................................ 101 25 541

(51) Int. Cl.
*B65G 15/34* (2006.01)

(52) U.S. Cl. ........................................................ 198/847

(58) Field of Classification Search ................ 198/846, 198/847

See application file for complete search history.

(56) References Cited

U.S. PATENT DOCUMENTS 3,650,874 A 3/1972 Job et al.
4,287,984 A * 9/1981 Okamoto et al. ........... 198/847
4,289,338 A * 9/1981 Cook ......................... 198/847
4,334,468 A 6/1982 Guttinger et al.
4,674,622 A * 6/1987 Utsunomiya et al. ....... 198/847
4,957,199 A * 9/1990 Wokke et al. ............. 198/847
5,746,302 A 5/1998 Bowman
5,792,513 A 8/1998 Koslow et al.
5,906,269 A * 5/1999 Zabron et al. .............. 198/847
5,938,007 A * 8/1999 Fujihiro et al. ............. 198/847

FOREIGN PATENT DOCUMENTS

| | | |
|---|---|---|
| DE | 17 29 001 | 6/1971 |
| DE | 22 51 180 | 4/1973 |
| DE | 28 22 141 | 11/1979 |
| DE | 1592 56 | 3/1983 |
| EP | 0 472 436 | 2/1992 |

(Continued)

*Primary Examiner*—James R. Bidwell
(74) *Attorney, Agent, or Firm*—Walter Ottesen

(57) ABSTRACT

A conveyor belt (2) includes a reinforcement (4) built up of at least one reinforcement layer (4*a*, . . . ) which includes fabric or cord and cover plates (8*a*, 8*b*) can be arranged on the carrier side and/or running side with the cover plates being made of elastomer or a rubber mixture. In order to prevent baking-on and dirtying during transport of the different goods, especially mass goods, the conveyor belt (2) is provided with a practice-proven durable and permanent anti-adhering surface. A plastic coating (10) is applied to the conveyor belt (2) on the carrier side and is an anti-adhering coating. The plastic coating (10) preferably is made of ultra high molecular polyethylene. The polyethylene foil (10) can be vulcanized to the carrier side cover plate (8*a*) or, in lieu of the carrier side cover plate (8*a*), the polyethylene foil can be vulcanized directly to the reinforcement (4) comprising at least one rubberized reinforcement layer (4*a*, . . . ).

28 Claims, 2 Drawing Sheets

FOREIGN PATENT DOCUMENTS

| | | |
|---|---|---|
| FR | 1 567 289 | 5/1969 |
| FR | 2 210 251 | 7/1974 |
| GB | 917 277 | 1/1963 |
| GB | 1 097 034 | 12/1967 |
| GB | 1 402 275 | 8/1975 |

* cited by examiner

CONVEYOR BELT WITH PLASTIC COVERING

RELATED APPLICATION

This application is the national stage of PCT/EP 02/05581, filed May 22, 2002, designating the United States.

FIELD OF THE INVENTION

The invention relates to a conveyor belt having a coating of plastic and a method for manufacturing the same. The basic idea of the subject matter of the invention comprises preventing the baking-on and dirtying of conveyor belts during the transport of the most different goods, especially mass goods.

The use of mechanical cleaning systems for conveyor belts is known. For example, there are belt scrapers which are applied especially in the region of the direction-changing rollers. The disadvantage of such belt scrapers is that a baking-on is not prevented and that a premature wear of the cover plate is caused during the scraping operation by the direct contact of the scraper and the rubber cover plate.

Because belt scrapers have been shown to be unsatisfactory, it has been suggested to provide conveyor belts with dirt-repelling cover layers. For this purpose, and in accordance to East German Patent 23 01 192, low molecular polyethylene in different doses is admixed to the rubber mixture of the conveyor belt cover layers. With such an anti-adhesive additive in the cover plate rubber, one had hoped for an overall anti-adhesive effect. However, because this is only a mixture having a certain percentage of additive, the anti-adhesive effect is overall less than in a pure anti-adhesive coating.

Conveyor belts having a plastic coating are likewise known.

DE-OS 22 51 180 describes a belt conveyor whose surface has a coating of polyethylene or polytetrafluoroethylene. The polytetrafluoroethylene is also in the marketplace under the designation "Teflon" and has a known anti-adhesive effect. However, an inadequate readiness to bend of the belt conveyor coated with polytetrafluoroethylene has been shown. In order to realize such a bending readiness, it was necessary to provide the polytetrafluoroethylene layer of the belt conveyor with transverse rills (cuts) (FIG. 3). In addition, a curving or bowl effect resulted which made longitudinal rills necessary in addition to the transverse rills (FIG. 4). The anti-adhering effect was lost because of the transverse and longitudinal rills.

According to DE-OS 28 22 141, the fabric belt of a conveyor belt is glued with a fluoroplastic foil. The gluing method is most complicated. The strength of the glued attachment is inadequate. The described gluing attachment is unsuitable for a rough usage.

SUMMARY OF THE INVENTION

According to the task which has led to the present invention, a conveyor belt is to be provided with a practice-proven anti-adhering surface which is permanent and resistant to wear.

The anti-adhering coating of the invention has a self-cleaning action (repellent) so that a use of scrapers is no longer necessary. The anti-adhering coating of the conveyor belts of the invention has been shown to be advantageous for the most different goods to be conveyed.

In experiments carried out in practice, it has been shown that a coating of high-molecular polyethylene (PE) not only exhibits an outstanding anti-adhering effect but also an adequate readiness to bend.

Furthermore, the coating has a better resistance to wear than the cover plates of rubber so that a material thickness of 0.1 mm to 0.3 mm is fully adequate even for heavy loads.

Thick rubber cover plates can be omitted at least on the carrier side because of the wear resistance of the PE coating. The readiness for bending of the belt is increased when omitting cover plates on the carrier side.

The anti-adhering action of the PE material is supported by an ultra smooth surface.

The vulcanization method of the invention guarantees a permanently tight adherence of the PE foil to the rubber lower layer.

If, in addition, the extensibility of the anti-adhering coating is adapted to the extensibility of the reinforcement layers, then the unwanted curving or bowl effect is avoided.

A cleaning brush has been shown to be advantageous for conveyor belts which tend to a high degree to bake on. Such a cleaning brush is efficient and causes no additional wear of the belt surface.

The anti-adhering coating of the invention leads to a reduction of the cleaning costs. A reduction of the acquisition costs and a lengthening of the service time results because a use of scrapers is unnecessary. Bacteria and other infectious germs cannot settle permanently on the anti-adhering coating of the conveyor belt. In this way, the risk of sickness is reduced, for example, in the recycling industry and in compost facilities.

Testing has shown that conveyor belts having the anti-adhering coating of the invention can be advantageously used in the most different areas of application, for example, in recycling, in composting and in the lime sandstone industry.

The manufacture of belts according to the invention takes place first in a manner known per se, that is, fabric→calender method (skimming and covering).

According to the invention, a polyethylene foil is applied to the unvulcanized cover plate in advance of the vulcanization of the conveyor belt. The polyethylene foil is approximately 0.2 mm thick and is either applied to the unvulcanized cover plate in a strip or overlappingly (two foil widths). Thereafter, the polyethylene foil is welded to the cover plate during the vulcanization of the rubber.

Here, the heating temperature and/or the vulcanization time is to be considered so that a problem-free welding to the cover plate is ensured and a migration of constituents out of the rubber mixture through the foil is prevented.

The finished product is a rubber conveyor belt having anti-adhesive characteristics resistant to oil and chemicals and being built up of a carcass of several fabric layers or steel cords having a rubberization on the basis of natural rubber, SBR rubber or EPDM rubber whose carrier-side cover plate is resistant to wear and to oil and is anti-adhesive because of the plastic coating.

The plastic coating is based preferably on a UHMW-polyethylene foil of 0.1 to 0.5 mm thickness and is homogeneously adherently joined to the base body by the vulcanization process.

The plastic coating provides:

1. A resistance to oil which is achieved otherwise only utilizing rubber cover plates on the basis of the significantly more expensive nitrile rubber or chloroprene rubber. Now, even a belt configuration of non-oil resistant rubbers can be permanently protected against the effects of oil.

2. Anti-adhesive characteristics which lead to the situation that moist goods to be conveyed such as gypsum, clay or titanium dioxide no longer adhere. With this effect, a scraper can be entirely omitted or can be replaced by significantly gentler brushes or rubber bars. Whereas normal rubber conveyor belts wear rapidly because of strongly acting stripping systems, the coated belt does not need these and therefore suffers no wear.
3. Wear resistance/service time of conveyor belts:

In practice, the service life is significantly lengthened because the UHMW-Polyethylene is more scrape resistant, impact resistant and nothing resistant than the rubber cover plate. This is so even with a reduction of the thickness of the rubber cover plate used to date.

BRIEF DESCRIPTION OF THE DRAWING

Various embodiments of the invention are shown in the drawings and are explained in greater detail in the following description.

DESCRIPTION OF THE PREFERRED EMBODIMENT OF THE INVENTION

Figure 1:
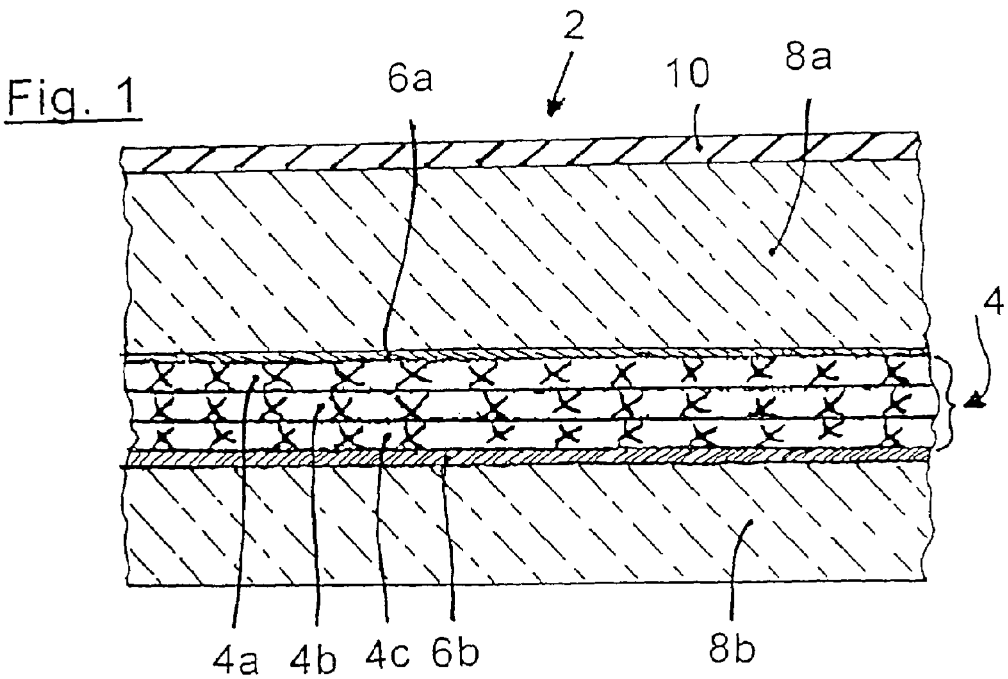
FIGS. 1, 2 and 3 show three conveyor belts, in segments, and in each case, the corresponding longitudinal section or transverse section.

The conveyor belt 2 shown in FIG. 1 includes a reinforcement 4 which comprises three layers (4*a*, 4*b*, 4*c*) of an EP fabric which is skimmed on both sides (rubberization 6*a*, 6*b*). As a reinforcement 4, steel cords can also be used. The reinforcement 4, which is rubberized on both sides, is covered with cover plates (8*a*, 8*b*) on the carrier side and on the running side. A polyethylene coating 10 is vulcanized to the carrier side cover plate 8*a*.

The PE foil 10, which is to be applied, is 0.2 mm thick and is applied in wide strips. The foil 10 can also be applied in two or several mutually overlapping strips.

Figure 2:
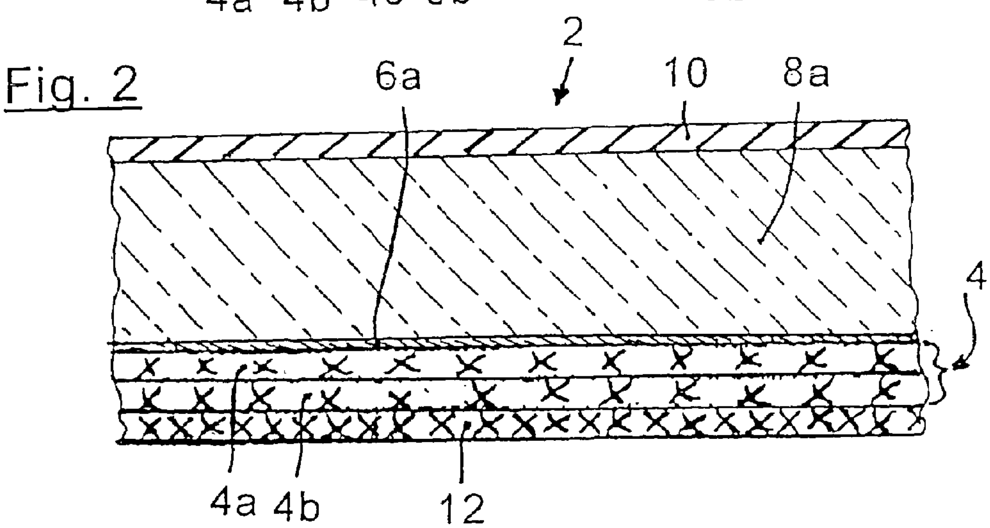

In the alternate embodiment of the invention shown in FIG. 2, the basic configuration of the conveyor belt 2 comprises two layers (4*a*, 4*b*) of a reinforcement 4. On its lower side, that is, its running side, the reinforcement 4 is covered with a fabric slide layer 12. A cover plate, which is otherwise usual on the running side in conveyor belts, is here omitted.

The upper side of the reinforcement 4 is rubberized (rubberization 6*a*). Conventional cover plates 8*a* are located on the reinforcement 4 which is rubberized on the carrier side.

In the same way as in the embodiment shown in FIG. 1, a polyethylene foil 10 is applied by vulcanization to the carrier side cover plates 4. Here, too, the PE foil 10, which is to be applied, is 0.2 mm thick and is applied in strips. The foil 10 can also be applied in two or several mutually overlapping strips.

Figure 3:
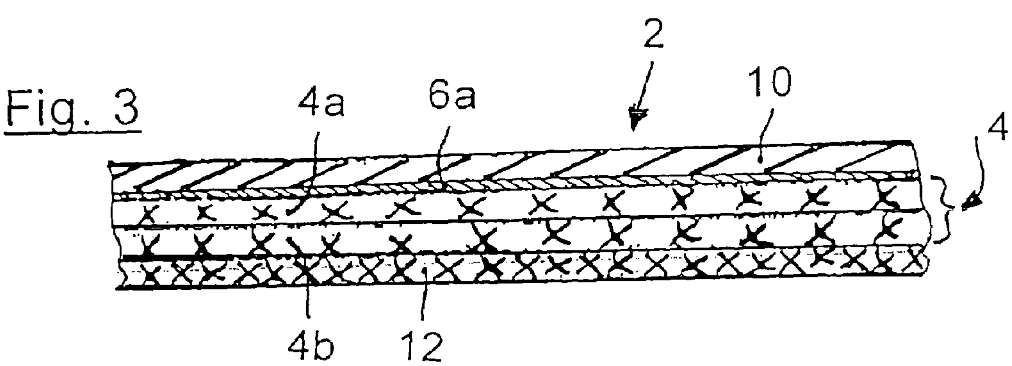

FIG. 3 shows a further variation of the invention. The basic configuration of the conveyor belt 2 corresponds to that shown in FIG. 2; that is, the conveyor belt 2 comprises two layers (4*a*, 4*b*) of a reinforcement 4. As in FIG. 2, a fabric slide layer 12 is provided on the reinforcement 4 on its running lower side. The reinforcement 4 is rubberized (rubberization 6*a*) on the carrier side. In contrast to the embodiments of FIGS. 1 and 2, and in accordance with the invention, a polyethylene foil 10 is applied by vulcanization directly to the carrier side rubberization.

Figure 4:
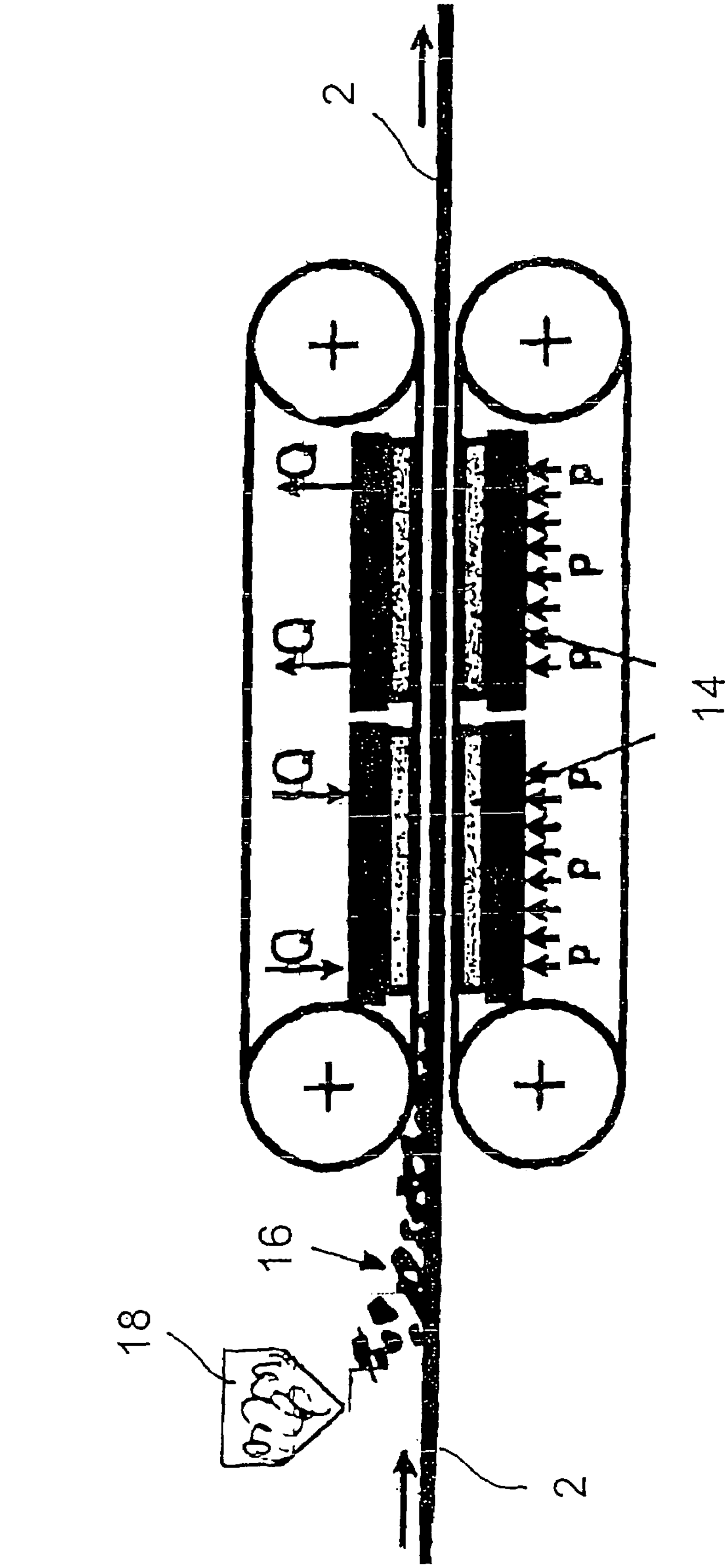
FIG. 4 shows a manufacturing principle in accordance with the invention for coating conveyor belts.

FIG. 4 shows a method for powder coating conveyor belts 2. Before entering into the double band press (double band assembly) 14, a plastic powder 16 is scattered on the blank of the conveyor belt 2 or on a finished vulcanized conveyor belt 2. The powder 16 comprises ultra high molecular polyethylene (UHMW-PE) and can be adjusted to be anti-static with soot.

One can use a commercially available spreader 18 for spreading the powder 16 on the conveyor belt 2. A spreader device equipped with a spiked roller has been shown to be especially useful. The spread-on quantity should amount to approximately 100 to 500 g/m$^2$.

In the double band assembly 14, the powder 16 is sintered or melted to a film utilizing a suitable temperature and suitable pressure and, at the same time, joined in an adhering manner with the rubber of the conveyor belt 2. In the schematic, the symbols ↓Q, ↓Q indicate a heating zone (temperature approximately 150° C.) and the symbols ↑Q, ↑Q indicate a cooling zone. The symbols ↑P, ↑P symbolize isobaric operation. A coated vulcanized belt 2 leaves the double band press 14.

REFERENCE NUMERAL LIST

2 Conveyor Belt, Belt
4 Reinforcement
4*a*, 4*b*, 4*c* Reinforcement Layers, Fabric Layers
6*a*, 6*b* Rubberization
8*a*, 8*b* Cover Plates
8*a* Carrier Side Cover Plate(s)
8*b* Running Side Cover Plate(s)
10 Plastic Layer, Anti-Adhering Coating, Foil, Polyethylene Foil
12 Fabric Slide Layer
14 Double Band Press, Double Band Assembly
16 Plastic Powder, Polyethylene Powder
18 Scatterer, Scatter Device
↓Q Heating Zone
↑Q Cooling Zone
↑P, ↑P, . . . Isobaric Pressure

What is claimed is:

1. A conveyor belt having a running side and a carrier side and said conveyor belt comprising:
- a reinforcement including at least one reinforcement layer;
- said reinforcement layer including fabric or cord;
- said reinforcement having a first side facing toward said carrier side and a second side facing toward said running side;
- said reinforcement further including being rubberized on both of said first and second sides thereof; and,
- an anti-adhering coating disposed on said carrier side of said conveyor belt so as to define an additional layer of said conveyor belt.

2. A conveyor belt having a running side and a carrier side and said conveyor belt comprising:
- a reinforcement including at least one reinforcement layer:
- said reinforcement layer including fabric or cord;
- said reinforcement having a first side facing toward said carrier side and a second side facing toward said running side;
- said reinforcement further including being rubberized on both of said first and second sides thereof;
- a cover plate disposed on said reinforcement on said carrier side and said cover plate being made of an elastomer or a rubber mixture; and,
- an anti-adhering coating disposed on said cover plate so as to define an additional layer of said conveyor belt.

3. The conveyor belt of claim 2, wherein said cover plate is a first cover plate and said conveyor belt further comprises a second cover plate disposed on said second side of said reinforcement and said second cover plate is made of an elastomer or a rubber mixture.

4. A conveyor belt having a running side and a carrier side and said conveyor belt comprising:

a reinforcement including at least one reinforcement layer;

said reinforcement layer including fabric or cord;

said reinforcement having a first side facing toward said carrier side and a second side facing toward said running side;

said reinforcement further including being rubberized on both of said first and second sides thereof;

an anti-adhering coating disposed on said carrier side of said conveyor belt so as to define an additional layer of said conveyor belt; and, said anti-adhering coating being an ultra high molecular polyethylene (UHMW-PE) coating.

5. The conveyor belt of claim 4, wherein said anti-adhering coating has a thickness of 0.1 mm to 0.3 mm.

6. The conveyor belt of claim 4, wherein said anti-adhering coating has an ultra smooth surface.

7. The conveyor belt of claim 4, wherein said anti-adhering coating is applied by vulcanization.

8. The conveyor belt of claim 4, further comprising a fabric slide layer arranged on said second side of said reinforcement thereby defining said running side of said conveyor belt.

9. The conveyor belt of claim 4, wherein said anti-adhering coating is disposed directly on the rubberization side on said first side of said reinforcement.

10. The conveyor belt of claim 4, wherein a fabric slide layer is arranged on said second side of said reinforcement.

11. The conveyor belt of claim 4, wherein said anti-adhering coating has an extensibility which is comparable to the extensibility of said reinforcement or the extensibility of the reinforcement is comparable or adapted to the extensibility of said anti-adhering coating.

12. The conveyor belt of claim 4, wherein said conveyor belt is part of a conveyor belt assembly and said assembly includes a stationary cleaning brush for gently cleaning the surface of said carrier side of said conveyor belt during operation of said assembly.

13. A method for making a conveyor belt having a running side and a carrier side, the conveyor belt including a reinforcement having at least one reinforcement layer including fabric or cord; said reinforcement being rubberized on both of the first and second sides thereof; and wherein the manufacture is first carried out pursuant to a fabric-calender method (skimming and covering), the method then comprising the steps of:

before the vulcanization of the conveyor belt, applying an ultra high molecular polyethylene (UHMW-PE) foil to the first side of said reinforcement to form a sandwich configuration with said reinforcement; and, thereafter, continuously or discontinuously vulcanizing said sandwich configuration.

14. The method of claim 13, wherein said polyethylene foil is applied directly to the rubberized reinforcement.

15. The method of claim 13, wherein said polyethylene foil has a thickness of up to 0.3 mm and is either applied in a strip having a maximum width of 1,200 mm or is applied in two foil widths mutually overlapping.

16. The method of claim 13, wherein said reinforcement layer has a side facing toward the running side of said conveyor belt; and, a fabric slide layer is applied to said second side of said reinforcement to define the running surface of said conveyor belt.

17. A method for making a conveyor belt having a running side and a carrier side, the conveyor belt including a reinforcement having at least one reinforcement layer including fabric or cord; said reinforcement being rubberized on both of the first and second sides thereof with said first side facing toward said carrier side, the conveyor belt further including an unvulcanized cover plate arranged on said first side of said reinforcement with said cover plate being made of elastomer or a rubber mixture; and wherein the manufacture is first carried out pursuant to a fabric-calender method (skimming and covering), the method then comprising the steps of:

before the vulcanization of the conveyor belt, applying an ultra high molecular polyethylene (UHMW-PE) foil to the side of said unvulcanized cover plate to form a sandwich configuration with said cover plate and reinforcement; and, thereafter, continuously or discontinuously vulcanizing said sandwich configuration.

18. The method of claim 17, wherein said polyethylene foil has a thickness of up to 0.3 mm and is either applied in a strip having a maximum width of 1,200 mm or is applied in two foil widths mutually overlapping.

19. The method of claim 18, wherein said second side of said reinforcement faces toward the running side of said conveyor belt; and, a fabric slide layer is applied to said reinforcement at said second side to define the running surface of said conveyor belt.

20. A method of applying a coating to a fully vulcanized conveyor belt or a blank of a conveyor belt, the method comprising the steps of:

spreading a plastic powder of ultra high molecular polyethylene (UHMW-PE) on said conveyor belt or said blank; and, then passing said conveyor belt or said blank into a double band assembly.

21. The method of claim 20, wherein said conveyor belt comprises a reinforcement having at least one reinforcement layer including fabric or cord; said reinforcement having first and second sides and being rubberized on both of the first and second sides.

22. The method of claim 21, wherein the conveyor belt further comprises a cover plate arranged on said first side of said reinforcement with said cover plate being made of elastomer or a rubber mixture.

23. The method of claim 20, wherein said plastic powder is spread with the aid of a spreader.

24. The method of claim 20, wherein the plastic powder is sintered to a film or melted on in the double band assembly by a suitable temperature (heat, Q) and a suitable pressure (P) with the plastic powder being simultaneously adheringly joined to the rubber of the conveyor belt.

25. The method of claim 20, wherein soot is admixed to the polyethylene powder.

26. The method of claim 20, wherein the quantity of plastic powder to be scattered is approximately 100 to 500 $g/m^2$.

27. The conveyor belt of claim 1, wherein said anti-adhering coating is an ultra high molecular polyethylene (UHMW-PE) coating.

28. The conveyor belt of claim 2, wherein said anti-adhering coating is an ultra high molecular polyethylene (UHMW-PE) coating.

* * * * *

UNITED STATES PATENT AND TRADEMARK OFFICE

CERTIFICATE OF CORRECTION

PATENT NO. : 6,994,210 B2
DATED : February 7, 2006
INVENTOR(S) : Wolfgang Kerwel, Hans Kueppers and Meinolf Ziebarth It is certified that error appears in the above-identified patent and that said Letters Patent is hereby corrected as shown below:

Column 1,
Line 17, insert -- BACKGROUND OF THE INVENTION --.

Column 3,
Line 15, delete "nothing" and substitute -- notching --.
Line 30, delete "EMBODIMENT" and substitute -- EMBODIMENTS --.

Signed and Sealed this

Second Day of May, 2006

JON W. DUDAS
*Director of the United States Patent and Trademark Office*